United States Patent [19]
Landa

[11] Patent Number: 6,166,115
[45] Date of Patent: Dec. 26, 2000

[54] FLAME RESISTANT POLYPHENYLENE ETHER-POLYAMIDE RESIN BLENDS

[75] Inventor: Adrie Landa, Bergen op Zoom, Netherlands

[73] Assignee: General Electric Company, Pittsfield, Mass.

[21] Appl. No.: 09/235,985

[22] Filed: Jan. 22, 1999

[51] Int. Cl.$^7$ .................................................. C08K 5/5399
[52] U.S. Cl. ......................... 524/115; 524/100; 524/611; 524/588
[58] Field of Search ..................................... 524/611, 100, 524/588, 115

[56] References Cited

U.S. PATENT DOCUMENTS

| | | |
|---|---|---|
| 3,466,478 | 9/1969 | Gail . |
| 3,640,823 | 2/1972 | Linderman et al. . |
| 3,762,942 | 10/1973 | Putnam et al. . |
| 3,857,655 | 12/1974 | Tschirky . |
| 3,953,165 | 4/1976 | Pepperman, Jr. et al. . |
| 3,968,188 | 7/1976 | Birum et al. . |
| 3,992,352 | 11/1976 | Murch . |
| 3,997,505 | 12/1976 | Albright . |
| 4,020,262 | 4/1977 | LeBlanc et al. . |
| 4,049,754 | 9/1977 | Weil . |
| 4,053,450 | 10/1977 | Golborn et al. . |
| 4,136,037 | 1/1979 | LeBlanc et al. . |
| 4,148,602 | 4/1979 | LeBlanc et al. . |
| 4,632,946 | 12/1986 | Muench et al. . |
| 5,352,830 | 10/1994 | Foa et al. . |
| 5,357,003 | 10/1994 | Smits et al. ............................. 525/393 |
| 5,455,292 | 10/1995 | Kakegawa et al. . |
| 5,468,530 | 11/1995 | Gotz et al. ............................. 428/36.4 |
| 5,561,193 | 10/1996 | Gottschalk et al. . |

FOREIGN PATENT DOCUMENTS

| | | |
|---|---|---|
| 0 171 730 | 2/1986 | European Pat. Off. . |
| 0171730 | 2/1986 | European Pat. Off. . |
| 1544869 | 6/1969 | Germany . |
| 5-186681 | 1/1992 | Japan . |
| 5-156116A | 6/1993 | Japan . |
| 7-41655 | 7/1993 | Japan . |
| 9-291208 | 4/1996 | Japan . |
| 9-291209 | 4/1996 | Japan . |
| 10-175985 | 12/1996 | Japan . |
| 10-175985A | 6/1998 | Japan . |
| GE 2043083 | 10/1980 | United Kingdom . |

OTHER PUBLICATIONS

Appendix A—McGraw–Hill Encyclopedia of Chemistry, Title Page and page No. 53, Amorphous solid—total of 2 pages.

Appendix B—Handbook of Plastics Testing Technology by Vishu Shah, a Wiley–Interscience Publication, Title page and pp. 184 and 185—total of 3 pages.

Preparation of Sterically Hindered Phosphoramidates by John J. Talley 1988.

*Primary Examiner*—Robert Dawson
*Assistant Examiner*—Kuo-Liang Peng

[57] ABSTRACT

The present invention relates to flame retardant compositions of compatibilized polyphenylene ether-polyamide resin blends containing at least one phosphoramide compound. The present invention also relates to articles made from the resin compositions as well as methods to make flame retardant compositions of compatibilized polyphenylene ether-polyamide resin blends.

19 Claims, No Drawings

FLAME RESISTANT POLYPHENYLENE ETHER-POLYAMIDE RESIN BLENDS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to flame retardant compositions of compatibilized polyphenylene ether-polyamide resin blends containing at least one phosphoramide compound.

The invention also relates to the methods to prepare flame retardant compositions of compatibilized polyphenylene ether-polyamide resin blends and articles formed out of the compositions.

2. Brief Description of the Related Art

Poly(phenylene ether) resins (referred to hereafter as "PPE") are commercially attractive materials because of their unique combination of physical, chemical, and electrical properties. Furthermore, the combination of these resins with polyamide resins into compatibilized blends results in additional overall properties such as chemical resistance, high strength, and high flow. Examples of such compatibilized blends can be found in U.S. Pat. No. 4,315,086 (Ueno, et al); U.S. Pat. No. 4,659,760 (van der Meer); and U.S. Pat. No. 4,732,938 (Grant, et al). The properties of these blends can be further enhanced by the addition of various additives such as impact modifiers, light stabilizers, processing stabilizers, heat stabilizers, antioxidants and fillers.

The physical properties of PPE/polyamide blends make them attractive for a variety of end-use articles in the automotive market, especially for under hood and various exterior components. Additional applications in other markets have been somewhat limited by the lack of an effective flame retardant system for these blends. Some of the desirable applications, for example, electrical connectors require a flame rating in the Underwriters Laboratory UL-94 protocol of at least, V-0, V-1, or V-2. The same resins must also have outstanding ductility, flow, and surface appearance. Conventional phosphate ester flame retardant additives when utilized in PPE/polyamide blends have an inadequate balance of properties to widely penetrate many potential markets.

It is therefore apparent that a need continues to exist for flame retardant PPE/polyamide compositions that retain the other attractive physical properties.

SUMMARY OF THE INVENTION

The present invention provides resin compositions comprising a compatibilized polyphenylene ether-polyamide resin composition and at least one phosphoramide compound. The present invention also provides articles made from the resin compositions in addition to methods to make flame retardant compatibilized polyphenylene ether-polyamide resin compositions.

DESCRIPTION OF THE DRAWINGS

Not applicable.

DETAILED DESCRIPTION OF THE INVENTION

In the practice of the invention, the resin composition comprises a compatibilized blend of a polyphenylene ether resin and a polyamide resin. Compatibilized blends of a polyphenylene ether resin and a polyamide resin are generally known in the art. These blends are typically made through reactive compounding techniques involving addition of a compatibilizing agent to compositions containing polyphenylene ether resin and polyamide resin. The compatibilizing agent is thought to result in reaction products between the polyphenylene ether resin and a polyamide resin and that these reaction products improve the compatibility between the polyphenylene ether resin and polyamide resin. The improved compatibility results in enhanced physical properties such as, for example, increased ductility. Illustrative compatibilizing agents for blends of polyphenylene ether resin and polyamide resin include citric acid, maleic anhydride, fumaric acid, malic acid as well as various derivatives of the foregoing.

The ratio of polyphenylene ether resin to polyamide resin can vary widely but is preferably adjusted so that the polyamide resin remains the continuous phase. Preferably the polyamide is at least about 40% by weight of the total resin composition. Increasing the level of the polyamide results in enhanced ductility and flow and is often preferred. The resin compositions may contain more than one type of polyamide resin such as a blend of nylon 6 and nylon 6,6. Moreover, the amine to acid endgroup ratio of the polyamide resin may also be varied as well as the relative viscosity of the polyamide contained within the resin composition.

The polyphenylene ether resins useful in the present invention include all known polyphenylene ether resins. Preferable resins include poly(2,6-dimethylphenylene ether) as well as the copolymer resins of 2,6-dimethylphenol and 2,3,6-trimethylphenol. These and other variations of the polyamide and the polyphenylene ether resins do not detract from the present invention.

The compatibilized blend of polyphenylene ether resin and polyamide resin may additionally contain various property modifiers such as elastomers for ductility enhancement. Useful elastomers for this purpose are known in the art and include, for example, styrenic block copolymers and various acid functionalized ethylene-propylene copolymers (e.g., EP-graft-maleic anhydride). Especially preferred are the so called elastomeric block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially or totally hydrogenated. Mixtures of these triblock copolymers and diblock copolymers are especially preferred in the present compositions.

Suitable A-B and A-B-A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly(α-methylstyrene)-polybutadiene, polystyrene-polybutadiene-polystyrene (SBR), polystyrene-poly(ethylene-butylene)-polystyrene, polystyrene-polyisoprene-polystyrene and poly(α-methylstyrene)-polybutadiene-poly(α-methylstyrene), as well as the selectively hydrogenated versions thereof. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON. Other property modifiers include nucleating agents, stabilizers, pigments, dyes, and mineral fillers and reinforcing agents.

Also useful elastomers include functionalized elastomeric polyolefins such as elastomeric polyolefins containing at least one moiety of the group consisting of anhydride, epoxy, oxazoline, and orthoester. The essential structural units of the elastomeric polyolefin are derived from ethylene and at least one $C_{3-8}$ 1-olefin, such as, propylene, 1-butene, 1-hexene, and 1-octene. The proportions of ethylene and at least one $C_{3-8}$ 1-olefin are not critical provided that they together constitute the major portion of the polymer.

In a preferred embodiment, the functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers.

A useful amount of the optional elastomeric block copolymers is between about 1% and about 15% by weight, preferably between about 1% and about 10% by weight, wherein the weight percentages are based on the entire weight of the composition. Mixtures of the previous described impact modifiers are also useful.

Another constituent of the resin compositions of the invention is at least one phosphoramide having a glass transition point of at least about 0° C., preferably of at least about 10° C., and most preferably of at least about 20° C., of the formula I:

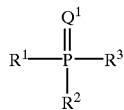

(I)

wherein $R^1$ is an amine residue, and $R^2$ and $R^3$ are independently an alkyloxy residue, aryloxy residue, aryloxy residue containing at least one alkyl or one halogen substitution or mixture thereof, or amine residue; and $Q^1$ is oxygen or sulfur. Oxygen is particularly preferred as the $Q^1$ moiety. The compositions may contain essentially a single phosphoramide or a mixture of two or more different types of phosphoramides. Compositions containing essentially a single phosphoramide are preferred.

It was unexpectedly found that phosphoramide compounds as described herein have significantly less affect on the polyamide amine endgroup number and/or molecular weight of the polyamide resin as compared to organophosphate esters known in the art for enhancing flame retardancy properties. It is preferred that the phosphoramide have a glass transition point of at least about 0° C., preferably of at least about 10° C., and most preferably of at least about 20° C. When a phosphoramide having a glass transition point of at least about 0° C. is used as a source of phosphorous in resin compositions, it was unexpectedly found that a higher heat deflection temperature of test specimens made from the resin composition could be obtained as compared to compositions containing an organophosphate ester known in the art.

Although the invention is not dependent upon mechanism, it is believed that selection of each of $R^1$, $R^2$, and $R^3$ residues that result in restricted rotation of the bonds connected to the phosphorus provide an increased glass transition point in comparison to similar phosphoramides with residues having a lesser degree of restriction. Residues having bulky substituents such as, for example, aryloxy residues containing at least one halogen, or preferably at least one alkyl substitution, result in phosphoramides having a higher glass transition point than similar phosphoramides without the substitution on the aryloxy residue. Likewise, residues wherein at least two of the $R^1$, $R^2$, and $R^3$ residues are interconnected, such as a neopentyl residue for the combination of the $R^2$ and $R^3$ residues, can lead to desired phosphoramides having a glass transition point of at least about 0° C.

In a preferred embodiment, the phosphoramide comprises a phosphoramide having a glass transition temperature of at least about 0° C., preferably of at least about 10° C., and most preferably of at least about 20° C., of the formula VI:

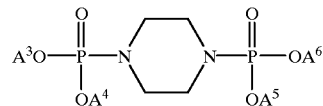

(VI)

wherein each of $A^{3-6}$ is an alkyl radical, aryl radical, or aryl radical containing at least one alkyl or halogen substitution or mixture thereof, or an amine residue.

In an especially preferred embodiment of the invention, each $A^{3-6}$ moiety is a 2,6-dimethylphenyl moiety or a 2,4,6-trimethylphenyl moiety. These phosphoramides are piperazine-type phosphoramides. In the above formula wherein each $A^{3-6}$ moiety is a 2,6-dimethylphenyl moiety, the glass transition temperature of the corresponding phosphoramide is about 62° C. and the melting point is about 192° C. Conversely, in the above formula wherein each $A^{3-6}$ moiety is phenyl, the glass transition temperature of the corresponding phosphoramide is about 0° C. and the melting point is about 188° C. It was unexpected that the glass transition temperature would be so high (i.e. about 62° C.) for the phosphoramide of formula wherein each of $A^{3-6}$ is a 2,6-dimethylphenyl moiety as compared to the corresponding phosphoramide of formula wherein each of $A^{3-6}$ is a phenyl moiety (i.e. about 0° C.), especially since the melting points for the phosphoramides differ by only about 4° C. For comparison, the glass transition temperature of tetraphenyl resorcinol diphosphate is about −38° C. It is also possible to make phosphoramides with intermediate glass transition temperatures by using a mixture of various substituted and non-substituted aryl moieties within the phosphoramide.

In another preferred embodiment, the phosphoramide comprises a phosphoramide having a glass transition temperature of at least about 0° C., preferably of at least about 10° C., and most preferably of at least about 20° C., of the formula VII:

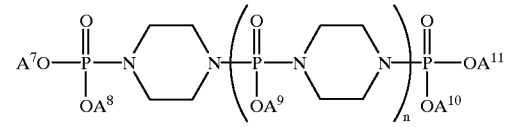

(VII)

wherein each of $A^{7-11}$ is independently an alkyl radical, aryl radical, or aryl radical containing at least one alkyl or halogen substitution or mixture thereof, or an amine residue, and n is from 0 to about 5. In a more preferred embodiment, each $A^{7-11}$ moiety is independently phenyl, 2,6-dimethylphenyl, or 2,4,6-trimethylphenyl and n is from 0 to about 5.

In another embodiment of the invention the phosphoramide comprises a phosphoramide having a glass transition temperature of at least about 0° C., preferably of at least about 10° C., and most preferably of at least about 20° C., of the formula VIII:

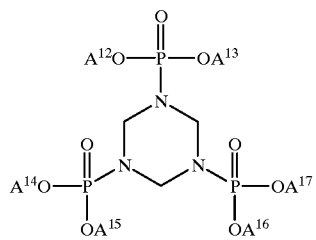

(VIII)

wherein each of $A^{12-17}$ is independently an alkyloxy radical, aryloxy radical, or aryloxy radical containing at least one alkyl or halogen substitution or mixture thereof, or an amine residue.

In another embodiment of the invention the phosphoramide comprises a phosphoramide having a glass transition temperature of at least about 0° C., preferably of at least about 10° C., and most preferably of at least about 20° C., of the formula IX:

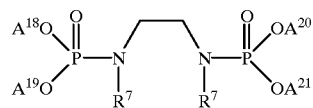

(IX)

wherein each of $A^{18-20}$ an alkyl, aryl, or an aryl radical containing at least one alkyl or halogen substitution or mixture thereof, or an amine residue, and each $R^7$ is an alkyl radical or both $R^7$ radicals taken together are an alkylene radical.

In another embodiment of the invention, the phosphoramide comprises a phosphoramide having a glass transition point of at least about 0° C., preferably of at least about 10° C., and most preferably of at least about 20° C., of the formula I:

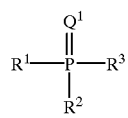

(I)

wherein $R^1$ is of the formula X:

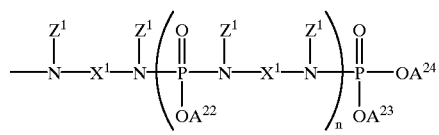

(X)

wherein each of $A^{12-24}$ is an alkyl radical, aromatic radical, or aromatic radical containing at least one alkyl or halogen substitution or mixture thereof, or an amine residue; each $Z^1$ is an alkyl radical, aromatic radical, or aromatic radical containing at least one alkyl or halogen substitution or mixture thereof; each $X^1$ is an alkyl radical, aromatic radical, or aromatic radical containing at least one alkyl or halogen substitution or mixture thereof, and n is from 0 to about 5, and $R^2$ and $R^3$ are independently an alkyloxy residue, aryloxy residue, aryloxy residue containing at least one alkyl or halogen substitution or mixture thereof, or an amine residue.

In another embodiment of the invention, the phosphoramide comprises a phosphoramide having a glass transition point of at least about 0° C., preferably of at least about 10° C., and most preferably of at least about 20° C., of the formula I:

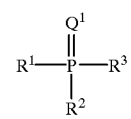

(I)

wherein $R^1$ is of the formula XI:

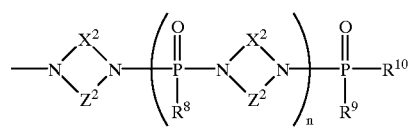

(XI)

wherein each $X^2$ is alkyl, aryl, or alkaryl, each $Z^2$ is alkyl, each of $R^8$, $R^9$, and $R^{10}$ is independently an alkyloxy residue, aryloxy residue, aryloxy residue containing at least one alkyl or halogen substitution or mixture thereof, or an amine residue, and n is from 0 to about 5, and $R^2$ and $R^3$ are independently an alkyloxy residue, aryloxy residue, aryloxy residue containing at least one alkyl or halogen substitution or mixture thereof, or an amine residue. In an especially preferred embodiment, the phosphoramide is derived from piperazine (i.e. $X^2$ and $Z^2$ are each —$CH_2$—$CH_2$—).

In another preferred embodiment, the phosphoramide comprises a cyclic phosphoramide having a glass transition point of at least about 0° C., preferably of at least about 10° C., and most preferably of at least about 20° C. of the formula XII:

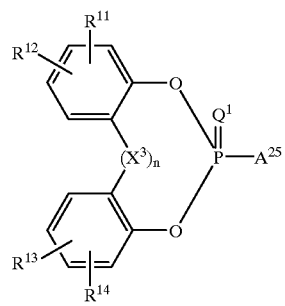

(XII)

wherein each of $R^{11-14}$ is independently a hydrogen or an alkyl radical, $X^3$ is an alkylidene radical, $Q^1$ is oxygen or sulfur, and $A^{25}$ is a group derived from a primary or secondary amine having the same or different radicals that can be aliphatic, alicyclic, aromatic, or alkaryl, or $A^{25}$ is a group derived from a heterocyclic amine, or $A^{25}$ is a hydrazine compound. Preferably $Q^1$ is oxygen. It should be noted that when n is 0, then the two aryl rings are linked together at that site (i.e. where $X^3$ is absent) by a single bond in the positions ortho,ortho' to the phosphoryl bonds.

In another preferred embodiment, the phosphoramide comprises a cyclic phosphoramide having a glass transition point of at least about 0° C., preferably of at least about 10° C., and most preferably of at least about 20° C. of the formula XIII:

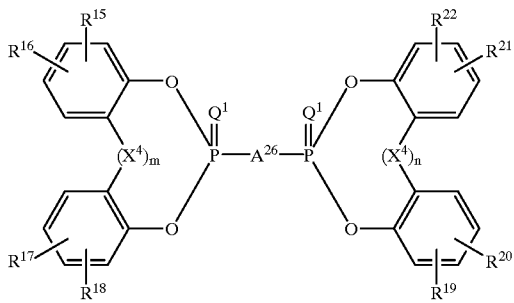

(XII)

wherein $Q^1$ is oxygen or sulfur; each of $R^{15-22}$ is independently a hydrogen or an alkyl radical; $X^4$, when present, is an alkylidene radical; m and n are each independently 0 or 1; and $A^{26}$ is

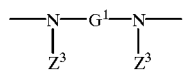

wherein $G^1$ is sulfur, an alkyl radical, aryl radical, or alkaryl radical and each $Z^3$ is independently an alkyl radical or an aryl radical; or wherein $A^{26}$ is

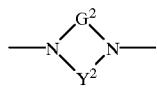

wherein $G^2$ is alkyl, aryl, or alkaryl, and $Y^2$ is alkyl. Preferred phosphoramides are those wherein Q is oxygen, $A^{26}$ is a residue of piperazine, and the phosphoramide has a center of symmetry at $A^{26}$. Highly preferred phosphoramides include those wherein $Q^1$ is oxygen, $A^{26}$ is a residue of piperazine, the phosphoramide has a center of symmetry at $A^{26}$, and at least one R substituent on each aryl ring is a methyl adjacent to the oxygen substituent, n and m are each 1, and $X^4$ is $CHR^{23}$ wherein $R^{23}$ is a hydrogen or an alkyl residue of from about 1 to about 6 carbon atoms. It should be noted that when either or both of m or n is 0, then the two aryl rings are linked together at that site (i.e. where $X^4$ is absent) by a single bond in the positions ortho, ortho' to the phosphoryl bonds.

It should be noted that in the descriptions herein, the words "radical" and "residue" used interchangeably, e.g. alkyl radical and alkyl residue are both intended to designate an alkyl moiety.

Phosphoramides of useful molecular structure are preferably prepared by the reaction of a corresponding amine such as, for example, piperazine or N,N'-dimethylethylenediamine with a diaryl chlorophosphate of the formula (aryl-O)$_2$POCl in the presence of a tertiary amine. This method of preparation is described in Talley, *J. Chem. Eng. Data*, 33, 221–222 (1988) and leads to specific phosphoramide compounds without repeating units. Alternatively, phosphoramides may be prepared by the reaction of the corresponding amine with P(O)Cl$_3$ in the presence of a tertiary amine, with the desired hydroxyl containing compound added simultaneously or subsequently to the addition of the amine. Addition of a diamine or triamine to P(O)Cl$_3$ with simultaneous or subsequent addition of the hydroxyl containing compound is believed to lead to repeating units of phosphoramide, often of 1 to about 5 phosphoramide linkages per compound. Similarly, addition of a diamine or triamine to a monosubstituted phosphoryl dichloride with simultaneous or subsequent addition of hydroxyl containing compound is also believed to lead to repeating units of phosphoramide.

The resinous compositions of this invention typically contain a flame retarding and/or processability enhancing amount of at least one phosphoramide. Flame retardancy is preferably measured according to the Underwriters' Laboratory UL-94 protocol. A flame retarding amount is a amount effective to render the composition at least a V-2 rating, preferably at least a V-1 rating, and most preferably a V-0 rating after testing in the UL-94 protocol at a thickness of about 0.125 inch, preferably about 0.06 inch, and most preferably at a thickness of about 0.03 inch. Enhanced processability can be determined, for example, as a reduction in extruder torque during compounding, reduced pressure in injection molding, reduced viscosity, and/or increased cycle time.

Flame retardancy is preferably measured according to the Underwriters' Laboratory UL-94 protocol. A flame retarding amount is an amount effective to render the composition at least a V-2 rating, preferably at least a V-1 rating, and most preferably a V-0 rating after testing in the UL-94 protocol when measured on a test specimen of about 0.03 to about 0.125 inch in thickness by about 0.5 inch by about 5 inch, preferably about 0.125 inch in thickness by about 0.5 inch by about 5 inch, more preferably about 0.06 inch in thickness by about 0.5 inch by about 5 inch, and most preferably about 0.03 inch in thickness by about 0.5 inch by about 5 inch dimensions. Enhanced processability can be determined, for example, as a reduction in extruder torque during compounding, reduced pressure in injection molding, reduced viscosity, and/or decreased cycle time.

The amount of at least one phosphoramide or mixture of at least one phosphoramide and at least one phosphorus additive is typically in the range of about 0.1–3 parts, preferably about 0.25–2.5 parts, of phosphorus per 100 parts of resinous materials (phr), all percentages herein being by weight. The total amount of phosphoramide or of phosphoramide/phosphorus additive mixture is most often in the range of about 1–50 phr, preferably 5–35 phr.

Compositions of the present invention can also include effective amounts of at least one additive selected from the group consisting of anti-oxidants, silicone fluids and oils, drip retardants, dyes, pigments, colorants, stabilizers, glass fibers, carbon fibers and carbon fibrils, small particle mineral such as clay, mica, and talc, antistatic agents, plasticizers, lubricants, and mixtures thereof. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, thio compounds and amides derived from various fatty acids. The preferred amounts of these additives generally ranges up to about 2% total combined weight based on the total weight of the composition.

In a preferred embodiment, at least one polysiloxane is also present in the compositions of the invention. Polysiloxanes compounds are known per se. Their properties vary from a comparatively low viscous liquid to rubber-like polymers. Polysiloxanes usually consist of a main chain of alternating silicon atoms and oxygen atoms, substituted with various groups at the silicon atom. The polysiloxane compounds may have different structures: homopolymer, block copolymer or random copolymer. Suitable polysiloxanes include liquids in which the substituents at the silicon atoms mainly consist of alkyl groups, for example, methyl groups or phenyl groups, or aryl groups, for example, phenyl groups, or a combination of the two. It is also possible that a part of the silicon atoms is bonded to a hydrogen atom.

It is possible to use polysiloxanes which comprise one or more groups (moieties) which are capable of reacting with a carboxyl group and/or an amine group. Examples of such groups include amine groups, epoxy groups and groups derived from carboxylic acids.

It is sometimes to be preferred to use a polysiloxane compound of formulas:

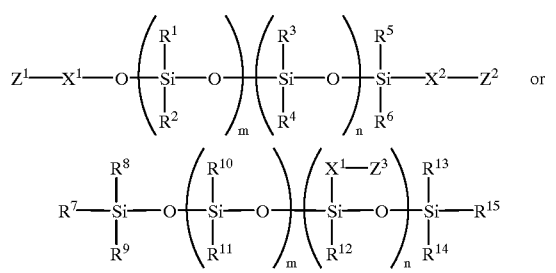

wherein m+n has a value of about 5 to about 2,000, and $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$, each independently of each other, represent a hydrogen atom or one of the following groups having 1 to 12 carbon atoms: alkyl, alkoxy, alkenyl, aryl, aralkyl, alkylaryl, which groups may be halogenated; wherein $X^1$, $X^2$, $X^3$, each independently of each other, represent one of the following groups: alkylene, cycloalkylene, arylene, aralkylene, alkylarylene; wherein $Z^1$, $Z^2$, $Z^3$ each represent one of the following groups: —$NR^{16}R^{17}$, —NH—$(CH_2)_k$ —$NR^{16}R^{17}$ in which $R^{16}$ and $R^{17}$, each independently of each other, represent a hydrogen atom or an alkyl group having 1–12 carbon atoms, k has a value from 1–10, an aliphatic or cycloaliphatic epoxide, a carboxylic acid group, $Z^1$ or $Z^2$ is a hydrogen atom, in which, however, the polysiloxane compound may not comprise simultaneously an amine group and an epoxide group, or not simultaneously an amine group and a carboxylic acid group, or not simultaneously an epoxide group and a carboxylic acid group. Suitable carboxylic acid groups include acid anhydride groups.

The preparation of the compositions of the present invention is normally achieved by merely blending the ingredients under conditions for the formation of an intimate blend. Such conditions often include mixing in single or twin screw type extruders or similar mixing devices which can apply a shear to the components.

All of the ingredients may be added initially to the processing system, or else certain additives may be precompounded with one or more of the primary components, preferably the PPE, the optional elastomers, and/or the polyamide. It appears that certain properties, such as impact strength and elongation, are sometimes enhanced by initially precompounding the PPE, elastomeric copolymers, optionally with any other ingredients, prior to compounding with the polyamide resin, however, these improvements are done at the expense of increasing the viscosity of the compatibilized composition. While separate extruders may be used in the processing, these compositions are preferably prepared by using a single extruder having multiple feed ports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

It should be clear that methods to make the compositions and articles made from the compositions as disclosed are within the scope of the invention.

All patents cited are incorporated herein by reference.

The invention will be further illustrated by the following examples.

EXPERIMENTAL

In the examples the following materials have been used:

| | |
|---|---|
| PPE: | a poly(2,6-dimethyl-1,4-phenylene ether) with an intrinsic viscosity of 45 ml/g as measured in toluene at 25° C. and a concentration of 0.6 gram per 100 ml; |
| PA-6,6: | a polyamide-6,6 with a viscosity of 54–62 ml/g according to ASTM D789 in a solution of 8.4% by weight of nylon in 90% Formic Acid |
| CAH: | citric acid monohydrate; |
| XPP: | N,N'-bis-[di-(2,6-xylenoxy)phosphinyl]piperazine, a compound according to formula 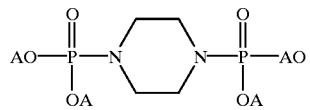 wherein each A is 2,6-dimethylphenyl residue |
| RDP | resorcinol bis(diphenyl) phosphate |
| BPA-DP | bisphenol A bis(diphenyl) phosphate |
| Si Oil | an amine functionalized polysiloxane fluid commercially available from GE Silicones as grade SF1706 |
| BP | boron phosphate commercially available from Budenheim as Budit 321 |

The ingredients were compounded in the weight ratios as indicated in the following table in a twin-screw extruder with temperature settings over the length of the extruder between about 280° and about 310° C. The screw speed was 300 rpm, the throughput 10 kilograms per hour. All ingredients were fed at the throat of the extruder with the exception of the polyamide; the polyamide was fed downstream about halfway the length of the extruder. The strands coming from the extruder were pelletized in a laboratory equipment and dried for about 3 hours at about 110° C. The dried pellets were injection molded into standard ASTM test specimens for measurement of physical properties. The FOT (total flameout times for first and second ignitions for 5 bars) and UL-94 classification was determined for each sample and the results are given in Table I.

TABLE I

| Sample: | 1 | 2 | 3 | 4 | 5 | 6 | 7 | 8 |
|---|---|---|---|---|---|---|---|---|
| PPE | 31.6 | 28.3 | 26.6 | 29.9 | 33.3 | — | 30.8 | 33.3 |
| CAH | 0.78 | 0.78 | 0.78 | 0.78 | 0.78 | — | 0.78 | 0.78 |
| XPP | 5 | 15 | 15 | 10 | 5 | 10 | 10 | 0 |
| Si oil | 3.4 | 0 | 3.4 | 1.7 | 0 | 0 | 0 | 2.2 |
| BP | 0 | 0 | 0 | 0 | 0 | 0 | 0 | 2.8 |
| PA-6,6 | 56.35 | 53.05 | 51.35 | 54.7 | 58.04 | 90 | 55.55[2] | 58.05 |
| adds[1] | 0.67 | 0.67 | 0.67 | 0.67 | 0.67 | 0 | 0.67 | 0.67 |
| Properties | | | | | | | | |
| UL-94 | V1 | V0 | V0 | V0 | fail | — | V0 | V0 |
| FOT 1 | 8.0 | 2.0 | 1.0 | 2.0 | 49.2 | — | 2.6 | 3.3 |
| FOT 2 | 16.2 | 4.8 | 4.0 | 5.6 | 0.0 | — | 4.2 | 5.5 |

[1]denotes a combination of 0.33 hindered phenol, 0.22 of 50% by weight KI in water, 0.11 carbon black, 0.01 CuI wherein all weights are by weight;
[2]denotes the composition of sample 6.

As can be seen from the properties of the compositions presented in Table I, compositions containing a phosphoramide (e.g., XPP) can achieve very short flame out times and very desirable V1 and V0 classification in the Underwriter's Laboratory testing protocol. Moreover, the addition of silicone oil used in combination with the phosphoramide allows for similar results at lower levels of phosphoramide.

The above results containing the phosphoramide are unexpected as phosphate esters commonly used as flame retardants typically react with the polyamide and interfere with the compatibilization chemistry for PPE-polyamide compositions. The data in Table II below illustrates this point by comparing the amine endgroup analysis and molecular weights of polyamide 6,6 heated with the XPP, RDP, and BPA-DP.

TABLE II

| | Amine endgroup (μeq/g) | molecular weight (versus polystyrene) |
|---|---|---|
| Heated PA 6,6 (control) | 43.9 | 70,600 |
| PA 6,6/RDP | 28.6 | 66,200 |
| PA 6,6/BDA-DP | 37.1 | 73,800 |
| PA 6,6/XPP | 44.0 | 70,500 |

The above data demonstrates that both RDP and BPA-DP, illustrative phosphate esters of the prior art, affect both the amine endgroup number and the molecular weight of the polyamide resin. XPP, a phosphoramide, unexpectedly did not significantly affect the amine endgroup number or the molecular weight of the polyamide. The amine endgroup number and molecular weight of the polyamide are believed to be key factors in the compatibilization of the PPE and polyamide and the ultimate physical properties of the compositions.

It should be clear that the present invention encompasses novel compositions as described herein, in addition to methods related to the compositions and articles made of the compositions and related to the methods.

What is claimed:

1. A resin composition comprising:
   a) a compatibilized polyphenylene ether-polyamide resin composition and
   b) at least one phosphoramide of the formula:

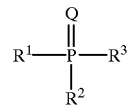

wherein $R^1$ is an amine residue, and $R^2$ and $R^3$ are independently an aryloxy residue, aryloxy residue containing at least one alkyl substitution, or an amine residue, and Q is an oxygen or sulfur atom.

2. The composition of claim 1 wherein $R^1$ is of the formula:

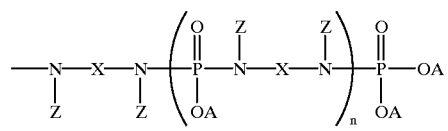

wherein each A is independently an aromatic or an aromatic radical containing at least one alkyl substitution, each Z is independently an alkyl radical or an aryl radical, each X is independently an alkyl radical or an aryl radical, and n is from 0 to about 5, and Q is an oxygen atom.

3. The composition of claim 1 wherein $R^1$ is of the formula:

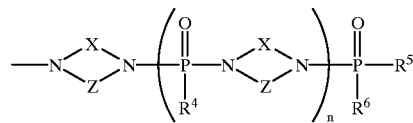

wherein each X is independently alkyl, aryl, or alkaryl, each Z is independently alkyl, each of $R^4$, $R^5$, and $R^6$ is independently an aryloxy residue, an aryloxy residue containing at least one alkyl substitution, or an amine residue, and n is from 0 to about 5, and Q is an oxygen atom.

4. The composition of claim 1 wherein the phosphoramide comprises a phosphoramide of the formula:

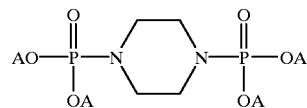

wherein each A moiety is independently a 2,6-dimethylphenyl moiety or a 2,4,6-trimethylphenyl moiety, and Q is an oxygen atom.

5. The composition of claim 1 wherein the phosphoramide comprises a phosphoramide of the formula:

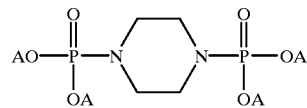

wherein each A moiety is a 2,6-dimethylphenyl moiety.

6. The composition of claim 1 wherein the phosphoramide is present in an amount effective to render the resin composition a flame rating of V-0, V-1, or V-2 in the Underwriter's Laboratory UL-94 protocol when measured on a test specimen of about 0.125 inch by about 0.5 inch by about 5 inch dimensions.

7. The composition of claim 1 wherein phosphoramide has a glass transition point of at least about 0° C.

8. The composition of claim 1 wherein the total amount of phosphorus per 100 parts of resinous materials is in the range of about 0.1–3 parts by weight of phosphorus.

9. The composition of claim 1 further comprising a polysiloxane.

10. An article made from the composition of claim 1.

11. A method to increase the heat distortion temperature of a flame resistant composition containing an amount of a phosphorous containing compound effective to render the composition a flame rating of at least V-2 in the Underwriter's Laboratory UL-94 protocol when measured on a test specimen of about 0.125 inch by about 0.5 inch by about 5 inch dimensions, wherein the method comprises at least one thermoplastic resin and at least one phosphoramide having a glass transition point of at least about 0° C.

12. The method of claim 11 wherein the phosphoramide is of the formula:

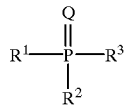

wherein $R^1$ is an amine residue, and $R^2$ and $R^3$ are independently an aryloxy residue, aryloxy residue containing at least one alkyl substitution, or an amine residue, and Q is an oxygen or sulfur atom.

13. The method of claim 11 wherein the method further comprises a polysiloxane.

14. The method of claim 11 wherein the composition has a flame rating of least V-1.

15. The method of claim 11 wherein the composition has a flame rating of least V-0.

16. The method of claim 11 wherein at least one phosphoramide has a glass transition point of at least about 10° C.

17. The method of claim 11 wherein at least one phosphoramide has a glass transition point of at least about 20° C.

18. The method of claim 11 wherein the phosphoramide comprises a phosphoramide of the formula:

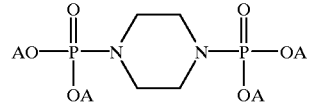

wherein each A moiety is independently a 2,6-dimethylphenyl moiety or a 2,4,6-trimethylphenyl moiety.

19. The flame resistant composition of claim 11.

* * * * *